United States Patent [19]
Takahashi et al.

[11] Patent Number: 5,172,021
[45] Date of Patent: Dec. 15, 1992

[54] DEFLECTOR MOTOR WITH GAS BEARING AND MAGNET THRUST BEARING

[75] Inventors: Masahiro Takahashi; Hiroshi Makino; Tomoharu Nonaka; Teiji Sata; Daisuke Yoshino, all of Kanagawa, Japan

[73] Assignee: Fuji Xerox Co., Ltd., Tokyo, Japan

[21] Appl. No.: 725,566

[22] Filed: Jul. 3, 1991

[51] Int. Cl.$^5$ .............................................. H02K 7/09
[52] U.S. Cl. ................................. 310/90.5; 310/90; 310/156; 384/115
[58] Field of Search .................... 310/67 R, 68 R, 90, 310/90.5, 156, 261; 359/212, 216, 217, 218, 219; 360/84, 99.08; 384/115, 292, 625

[56] References Cited

U.S. PATENT DOCUMENTS

| | | | |
|---|---|---|---|
| 3,899,702 | 8/1975 | Hanna et al. | 310/156 |
| 4,538,081 | 8/1985 | Kamiya et al. | 310/90.5 |
| 4,731,554 | 3/1988 | Hall et al. | 310/156 |
| 4,998,032 | 3/1991 | Burgbacher | 310/156 |

FOREIGN PATENT DOCUMENTS

90/13167 11/1990 PCT Int'l Appl. .

Primary Examiner—Steven L. Stephan
Assistant Examiner—Matthew Nguyen
Attorney, Agent, or Firm—Finnegan, Henderson, Farabow, Garrett and Dunner

[57] ABSTRACT

An electric motor, in which the thrust bearing action is performed by the magnetic attraction forces induced between a annular stator core with toroidal coils and magnets confronting the stator core, includes at least a cup-shaped member with a central cylindrical portion opened at the center, the cup-shaped member serving as a magnet yoke and a seat on which an element to be driven by the motor is mounted, and a cylindrical rotary sleeve press-fitted in the central cylindrical portion. This construction contributes to a reduction of the weight, size and manufacturing cost of the motor.

17 Claims, 4 Drawing Sheets

DEFLECTOR MOTOR WITH GAS BEARING AND MAGNET THRUST BEARING

BACKGROUND OF THE INVENTION

This invention relates to electric motors, and more particularly to an electric motor in which a thrust bearing action is performed by the magnetic attraction force between an annular stator core with toroidal coils and a magnet confronting the stator core.

A radial bearing is to prevent the shift of the center of rotation from a predetermined position when a force is applied to the axis of rotation in a direction perpendicular to the latter. Examples of the radial bearing are a fluid bearing such as a kinetic pneumatic bearing, a ball bearing, and a sliding bearing.

A thrust bearing is employed to prevent the displacement of a rotary shaft in the axial direction. In some electric motors, no thrust bearing is employed; that is, the magnetic attraction force between the magnet and the stator core which are confronted with each other is utilized to prevent the axial displacement of the rotary shaft.

A conventional electric motor of this type is as shown in FIG. 11. The electric motor has a kinetic pneumatic bearing as a radial bearing, and drives the polygon mirror of an optical deflector.

In FIG. 11, reference numeral 1 designates a shaft; 1—1, dynamic pressure generating grooves; 2, a housing; 3, a rotary sleeve; 4, a balance adjusting member engaging groove; 5, a yoke; 6, magnets; 7, a stator core; 8, studs; 9, a base plate; 10; a magnetic flux detecting element; 11, the aforementioned polygon mirror; 12, a flange; and 13, screws.

The rotor of the motor is mounted on the shaft 1 with a gap 15; that is, it comprises: the rotary sleeve 3; the yoke 5 and the magnets 6 mounted fixedly on the rotary sleeve 3 by press-fitting or welding; and the polygon mirror 11 mounted fixedly on the rotary sleeve 3 with the flange 12 and the screws 13.

On the other hand, the stator of the motor comprises: the housing 2; the shaft 1 whose one end portion is secured to the housing 2 for instance by press-fitting; the stator core 7 secured to the housing (the toroidal coils (not shown) being wound on the stator core 7); the base plate 9 supported by the studs 8 secured to the stator core 7; and the magnetic flux detecting element 10 mounted on the base plate 9.

The magnets 6 are permanent magnets. Magnetic attraction forces are induced between the stator core 7 and the magnets 6. The attraction forces form a torque producing source, and perform a thrust bearing action to prevent the magnets and the stator core 7 from shifting in the axial direction.

More specifically, when in FIG. 11 the magnets 6 move upwardly, the attraction forces act to move the magnets downwardly; and when the magnets 6 move downwardly, the attraction forces act to move the magnets upwardly. Hence, the magnets 6 and the stator core 7 are held at a predetermined position in the axial direction by the attraction forces so that they confront each other at all times. That is, it can be said that the magnets 6 and the stator core 7 form a magnetic thrust bearing.

The magnetic flux detecting element 10 is made up of a Hall element, for instance. The magnetic flux detecting element 10 is adapted to detect the leakage flux of the magnets 6 thereby to determine whether the N pole has passed or whether the S pole has passed during rotation of the magnets 6.

The detection signal of the magnetic detecting element is applied to a control section (not shown) through a circuit printed on the base plate 9. In response to the detection signal, the control section determines the direction of current flowing in the toroidal coils wound on the stator core 7, so that the mutual action with the magnets 6 produces the magnetic field the polarity of which is such that the rotation is continued.

When the rotary sleeve 3 is rotated, the dynamic pressure generating grooves 1—1 form a high-pressure air layer around the shaft 1 (in the gap 15). This pressure supports the rotary sleeve 3 in such a manner that the latter floats from the shaft 1. That is, a kinetic pneumatic bearing is formed there.

The dynamic pressure generating grooves may be formed in the inner cylindrical wall of the rotary sleeve 3.

The above-described high-pressure air layer acts to maintain the center of rotation of the rotor unchanged. For instance when the rotary sleeve 3 is shifted to the right in FIG. 11, the gap on the right side becomes larger than on the left side, and accordingly the pressure in the gap on the right side becomes smaller; whereas the gap on the left side becomes smaller than on the right side, and accordingly the pressure in the gap on the left side becomes larger. As a result, the rotary sleeve 3 is pushed to the left, and finally it is returned to the original position.

The polygon mirror 11 is polygonal as viewed from above, and has a number of mirrors forming its peripheral sides, to which a light beam such as a laser beam is applied. As the polygon mirror 11 rotates with light beam applied to its first mirror, the light beam reflected therefrom is gradually changed in direction; that is, it is deflected. As the polygon mirror is further rotated, the light beam is applied to the second mirror. Now, the light beam is deflected by the second mirror. Thus, the light beam reflected scans a predetermined angular range. In this case, the scanning speed depends on the speed of rotation of the polygon mirror.

However, the above-described motor suffers from the following difficulties:

(1) The motor is heavy.
(2) The motor is high in manufacturing cost.
(3) There has been a strong demand for miniaturization of end items (such as for instance a light deflector) in which the motor should be built, and accordingly the motor itself should be miniaturized. However, the motor has not been sufficiently miniaturized yet.
(4) Sometimes, dust enters the gap 15 from below (or from the side where the shaft 1 is coupled to the housing 2), thus obstructing the smooth rotation of the rotary sleeve 3, or damaging the surface of the shaft 1 and the inner cylindrical wall of the rotary sleeve 3.

First, the weight of the motor will be described. One of the factors which increases the weight of the motor resides in the rotary sleeve 3.

FIG. 12 is a perspective view showing the rotary sleeve 3 of the conventional motor. The rotary sleeve 3, as shown in FIG. 12, comprises a flange 3-1, a shaft inserting hole 3-2, and screw holes 3—3.

An element to be driven by the motor is mounted on the flange 3-1. The element to be driven is the polygon mirror 11 in the above-described motor.

As is seen from FIG. 12, the flange 3-1 is extended radially of the axis of the rotary sleeve 3. Therefore, it is weak when an axial force is applied to the rotary sleeve, and it may be deformed if the axial force is large. This deformation adversely affects the operation of the element to be driven (hereinafter referred to as "a driven element", when applicable). In the case where the polygon mirror 11 is mounted on the flange, the light beam will not be correctly reflected from the polygon mirror 11.

Accordingly, the flange should be large enough in thickness to prevent the deformation. This requirement increases the weight of the motor.

Next, the manufacturing cost of the motor will be described.

Heretofore, the rotary sleeve 3 is made of stainless steel. Originally, machining stainless steel materials is high in cost; however, the machining cost may be low in the case where the configuration is simple.

The conventional rotary sleeve 3 is not simple in configuration; that is, it has the flange 3-1 with several screw holes 3—3 as shown in FIG. 12. Hence, the machining cost is considerably high.

Since the rotary sleeve 3 is heavy, the rotor is also heavy. The magnets 6, which rotate the heavy rotor and function as the magnetic bearing, are made of rare earth to provide great magnetic forces. The magnet of rare earth is ten to fifty times as high in manufacturing cost as the magnet of ferrite.

These are typical factors for increasing the manufacturing cost of the motor.

Now, the miniaturization of the motor will be described.

The use of the rotary sleeve 3 with the thick flange 3-1 is one of the factors which obstructs the miniaturization of the motor.

Another factor is that the length of the wound coil is not effectively utilized. The motor is rotated by the electromagnetic force acting on the coil in which current flows; however, the electromagnetic force is not produced at all the parts of the wound coil. That is, the electromagnetic force is produced at the part confronting a magnet, but not at the part confronting no magnet. As is seen from the above description, if the ratio of the part of the wound coil where the electromagnetic force is produced to the remaining part is increased, then for production of the same torque the total length of the coil can be reduced as much. This will contribute to the miniaturization of the motor. However, in the conventional motor, the ratio of the part of the coil where no electromagnetic force is produced to the remaining part is large. Thus, the conventional motor is still insufficient in miniaturization.

The last factor, the entrance of dust into the gap 15 from below, will be described.

The entrance of dust into the gap 15 from above may be prevented by the provision of a cover relatively low in manufacturing cost in such a manner that it covers the upper surface of the shaft 1 and the gap 15. However, such a cover for preventing the entrance of dust into the gap from below cannot be manufactured at low cost, because there is the base of the shaft 1 below the gap.

SUMMARY OF THE INVENTION

Accordingly, an object of this invention is to eliminate the above-described difficulties accompanying a conventional electric motor in which the thrust bearing action is performed by the magnetic attraction forces induced between an annular stator core with toroidal coils and magnets confronted with the stator core.

The foregoing object and other objects of the invention have been achieved by the provision of an electric motor which, according to the invention, comprises: a housing; a shaft one end of which is secured to the housing; a cylindrical rotary sleeve mounted on the shaft, forming a gap around the shaft; a cup-shaped member with a cylindrical portion opened at the center, the cup-shaped member being secured to the rotary sleeve through the cylindrical portion, and serving as a seat on which an element to be driven by the motor is mounted; magnets secured through a magnet yoke to the outer cylindrical wall of the rotary sleeve; and a stator core secured to said housing, the stator core performing a thrust bearing action with the aid of magnetic attraction forces induced between the magnets and the stator core.

In the motor, in order to reduce the thickness of the motor and to decrease the manufacturing cost with the torque maintained unchanged, the magnets are provided both sides of the stator core. In order to further decrease the manufacturing cost, the magnets provided on both sides of the stator core are each made up of a plurality of smaller magnets which are spaced from one another. This contributes to a reduction of the weight and the manufacturing cost.

Furthermore, in the motor, a non-magnetic cylindrical wall for preventing the entrance of dust is coupled to the stator core at the end which is closer to the opening of the cup-shaped member. The provision of the non-magnetic cylindrical wall will greatly reduce the quantity of dust entering the gap between the shaft and the rotary sleeve, thus eliminating the difficulties that dust obstructs the smooth rotation of the rotary sleeve and damages the surface of the shaft or rotary sleeve.

The employment of the cup-shaped member with the cylindrical portion opened at the center, which serves as a magnet yoke and a seat on which an element to be driven by the motor is mounted, allows the rotary sleeve to be in the form of a simple cylinder. The cup-shaped member, being rigid because of its configuration, can be made of a thin metal plate.

Accordingly, the rotary sleeve can be manufactured with ease, and the cup-shaped member can be formed at low cost for instance by blanking or drawing a thin metal plate, which contributes to a reduction of the manufacturing cost. Since the cup-shaped member is made of a thin metal plate, the weight is reduced as much. Since the weight is reduced in this manner, the magnetic attraction force for the thrust bearing action may be not so great, and therefore magnets low in magnetic force can be employed. This also contributes to reduction of the manufacturing cost.

The arrangement of the magnets on both sides of the stator core doubles the total length of the parts of the toroidal coil on the stator core which produce electromagnetic forces.

Therefore, with magnets equal in performance, even if the axial length of the magnets and the stator core is reduced to a half, the same torque can be substantially obtained. In this case, the thickness of the motor can be reduced as much. Where reduction of the axial length is not required, the magnets can be replaced with magnets lower in magnetic force.

The nature, principle and utility of the invention will become more apparent from the following detailed

DETAILED DESCRIPTION OF THE INVENTION

Preferred embodiments of this invention will be described with reference to the accompanying drawings.

First Embodiment

Figure 1:
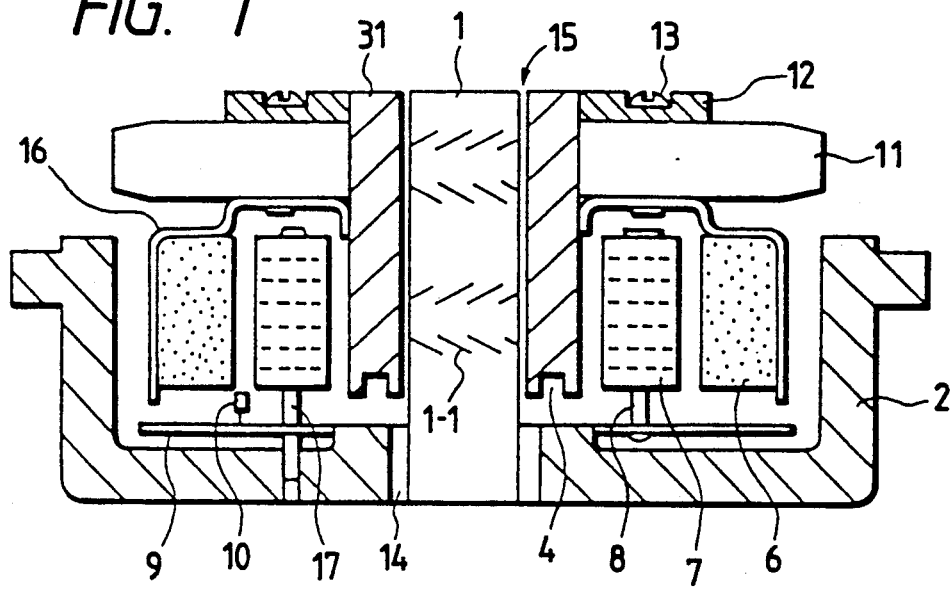
FIG. 1 is a sectional view of an example of an electric motor, which constitutes a first embodiment of this invention.
Figure 2:
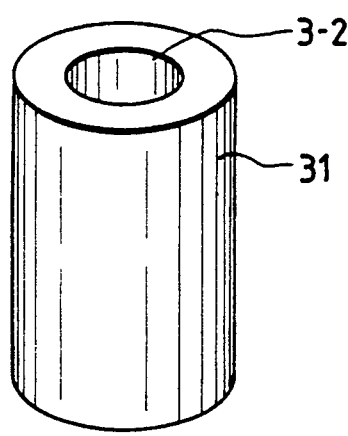
FIG. 2 is a perspective view showing a rotary sleeve in the motor shown in FIG. 1.
Figure 3:
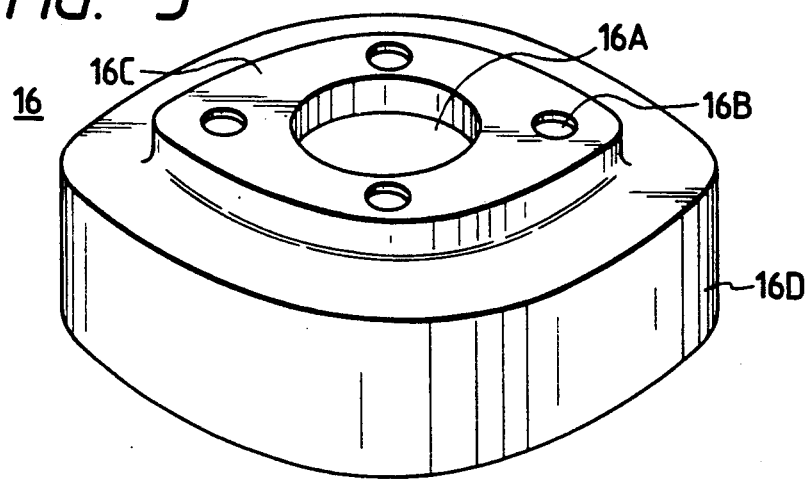
FIG. 3 is a perspective view showing a cup member in the motor shown in FIG. 1.
Figure 11:
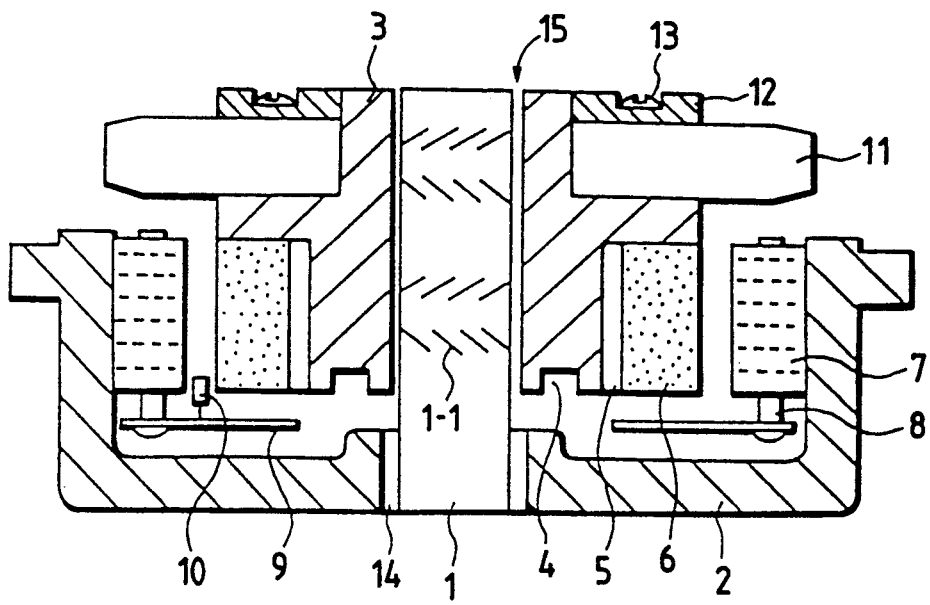
FIG. 11 is a sectional view of a conventional electric motor.
Figure 12:
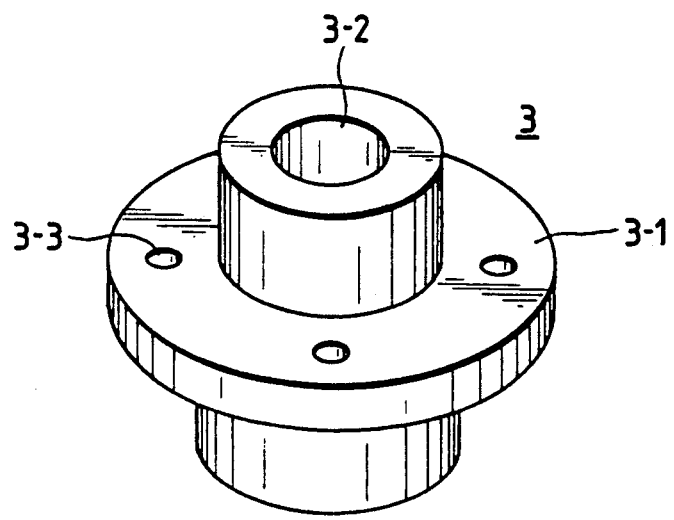
FIG. 12 is a perspective view of a rotary sleeve in the conventional motor shown in FIG. 11;.

An electric motor, which constitutes a first embodiment of the invention, is as shown in FIG. 1, in which parts corresponding functionally to those which have been described with reference to FIG. 11 are therefore designated by the same reference numerals or characters. In FIG. 1, reference numeral 31 designates a rotary sleeve; and 16, a cup member. The rotary sleeve 31 and the cup member 16 are shown in FIGS. 2 and 3 in more detail, respectively.

The conventional motor shown in FIG. 11 is of inner rotor type—the magnets of the rotor turn inside the stator core. On the other hand, the motor shown in FIG. 1 is of outer rotor type—the magnets of the rotor turn outside the stator core. The fact that there are available an inner rotor type motor, and an outer rotor type motor is well known in the art. The two motors are substantially equal in operation.

In addition, the motor shown in FIG. 1 is different from the conventional motor shown in FIG. 11 in the following points:

(a) The rotary sleeve 31 is in the form of a cylinder with no flange.

(b) The motor has the cup member 16 which serves as a magnet yoke and as a seat on which the driven element is to be mounted (in the conventional motor, the driven element is mounted on the flange). The cup member 16 should be made of magnetic material such as iron so that it serves as a magnet yoke.

In FIG. 3 showing the cup member 16, reference character 16A designates a rotary sleeve press-fitting opening; 16B, threaded holes; 16C, a seat; and 16D, a yoke.

The rotor of the motor is assembled as follows:

First, the rotary sleeve 31 is press-fitted into cup member 16 through the opening 16A as required, and then the magnets 6 are fixedly mounted on the inner cylindrical wall of the yoke 16D.

The driven element (which is a polygon mirror 11 in this case) is placed on the seat 16C of the cup member 16, and the flange 12 is placed on the driven element 11. Under this condition, the driven element 11 is fixedly secured to the seat 16C with the screws 13 screwed into the threaded holes 16B.

A cup-shaped structure comprising a circular bottom and a cylindrical wall extended from the periphery of the circular bottom is mechanically rigid. Therefore, in order to give mechanical strength to the cup member to the extent that the operation of the driven element is not obstructed by possible mechanical strain, the thickness of the cup member 16 of metal may be smaller than that of the flange of the rotary sleeve in the conventional motor. Thus, the weight of the cup member 16 is much smaller than the sum of the weight of the flange 3-1 and the yoke 5 of the conventional motor.

The cup member 16 can be formed by blanking or drawing a metal plate. This fact contributes to a reduction of the manufacturing cost of the motor, because the plate blanking or drawing operation is much lower in cost than a stainless steel grinding operation.

In the motor shown in FIG. 1, the balance adjusting member engaging groove 4 is formed in the rotary sleeve 31 similarly as in the conventional motor. However, the groove 4 may be eliminated. That is, the balance adjusting member may be mounted on the inner wall of the end portion of the yoke 16D. In this case, since it is unnecessary to form the groove 4, the manufacturing cost is reduced as much.

As for the balance adjusting member engaging groove 4, the same thing may be said about second and third embodiments of the invention (described later).

Figure 4:
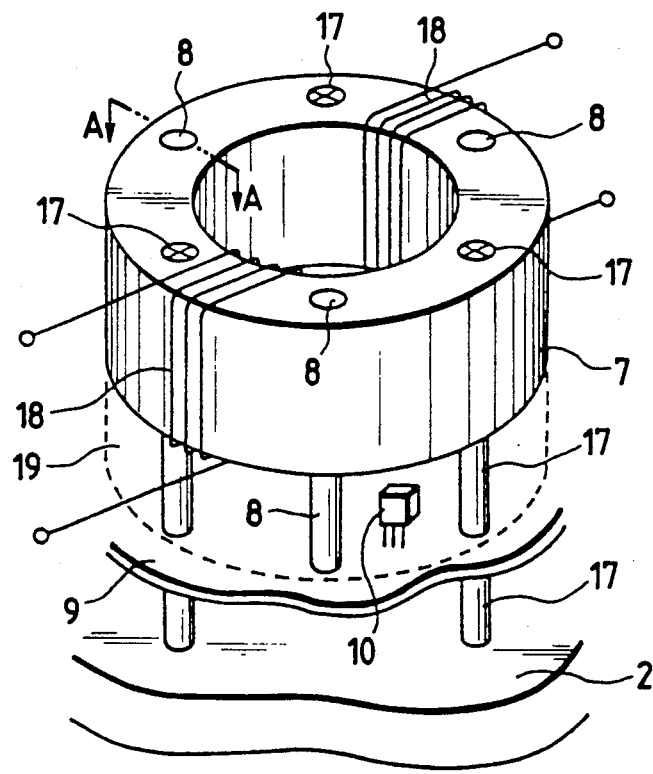
FIG. 4 is a perspective view, with parts cut away, showing a stator core and its relevant components in the motor shown in FIG. 1.

The stator core is shown in FIG. 4 in more detail. In FIG. 4, reference numeral 18 designates toroidal coils (which are not shown in FIG. 1 for simplification in illustration).

Only two toroidal coils 18 are shown; however, it should be noted that the number of toroidal coils 18 provided to the stator core 7 are corresponding to the number of magnetic poles of the magnet 6 mounted fixedly on the inner cylindrical wall of the yoke 16.

The stator core 7 is formed by a laminate of thin magnetic plates (such as silicon steel plates) which are tightened with the studs 8. The studs 8 further serve to provide a predetermined distance between the base plate 9 from the stator core 7.

Figure 5:
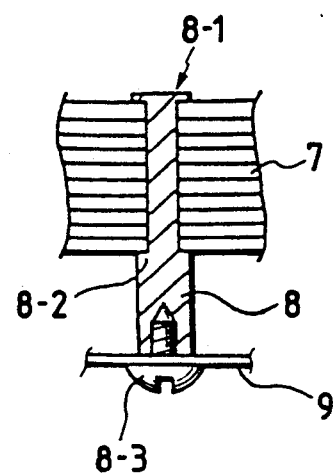
FIG. 5 is a sectional view taken along line A—A in FIG. 4.

FIG. 5 is a sectional view taken along line A—A, showing the stud 8. As is apparent from FIG. 5, the stud 8 has a step 8-1; that is, it comprises a lower portion larger in diameter, and an upper portion smaller in diameter. With the thin magnetic plates forming the stator core mounted on the upper portion of the stud 8, the top of the upper portion is hammered into a locking end 8-1.

More specifically, the thin magnetic plates forming the stator core 7 have through-holes, into which the upper end portion of the stud 8 are inserted. The thin magnetic plates are put on the upper end portion of the stud 8 successively, and then the top of the upper end portion is hammered to form the locking end 8-1, whereby the laminate of magnetic plates is formed.

The base plate 9 is secured to the lower ends of the studs 8 with screws 8-3. The length of the lower portion (from the step 8-2 to the lower end) of each stud 8 is set to a distance which should be provided between the base plate 9 and the stator core 7. The determination of the length (or the distance) should be made with the height of the magnetic flux detecting element 10 taken into consideration which is mounted on the base plate 9.

Referring back to FIG. 4, stator core 7 is mounted on the housing 2 to space the stator core 7 a predetermined distance from the housing 2 using a screws 17 and a collar surrounding the screws 17 (not shown). Therefore, the legs of the stator core fixing screws 17 are screwed into the housing 2 through the base plate 9.

There is a space between the stator core 7 and the base plate 9 although the studs 8 and the stator core fixing screws 17 are provided therebetween as was described above. Hence, dust may enter the inside of the stator core 7 through the space, and then the gap 15 between the shaft 1 and the rotary sleeve 31 (FIG. 1), thus adversely affecting the smooth rotation of the rotor, and damaging the surface of the shaft 1 and the inner cylindrical wall of the rotary sleeve 31 as was described before.

In order to eliminate this difficulty, a surrounding wall 19 made of a non-magnetic material may be provided between the lower end of the stator core 7 and the base plate 9 as indicated by the dotted line. The surrounding wall 19 may be made of a non-magnetic plate, or may be formed by filling with resin. Since the surrounding wall 19 is to prevent the entrance of dust, it is not always necessary that its thickness is equal to the thickness (measured radially) of the stator core 7.

It is not true that the provision of the surrounding wall 19 can completely prevent the entrance of dust into the gap 15 from below. In the motor shown in FIG. 1, the entrance of dust through the space between the stator core 7 and the base plate 9 can be prevented with the surrounding wall 19; however, there still remains an entrance path which is extended from the gaps between the stator core 7 and the magnets 6 through the space above the stator core 7 to the gap between the stator core 7 and the rotary sleeve 31.

However, the quantity of dust entering through the entrance path is considerably small, because the entrance path is zigzag and is longer than the path blocked with the surrounding wall 19.

Second Embodiment

Figure 6:
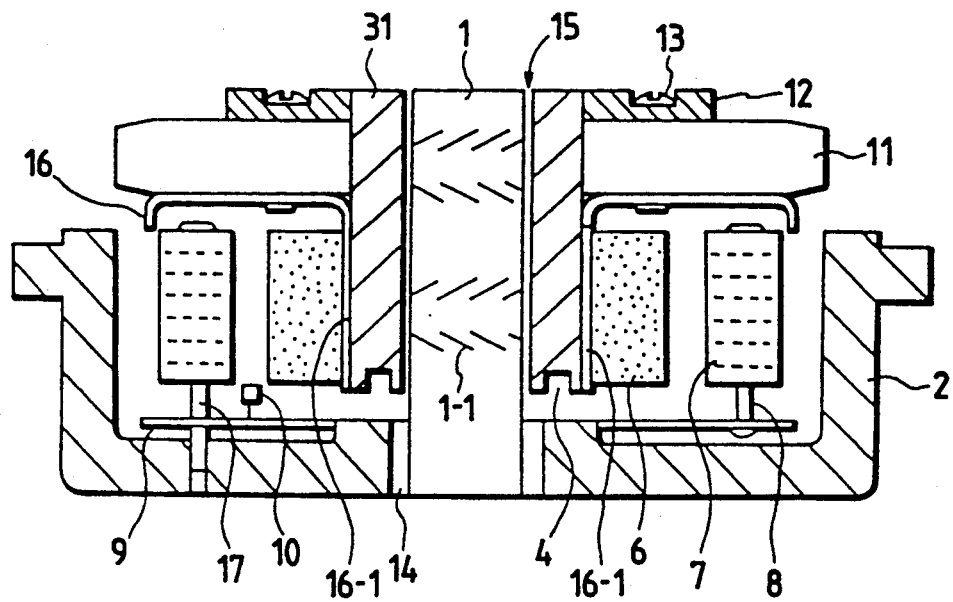
FIG. 6 is a sectional view of another example of the electric motor, which constitutes a second embodiment of the invention.

An electric motor, a second embodiment of the invention, is as shown in FIG. 6. The second embodiment is provided by applying the technical concept of the invention to an inner rotor type motor (while the first embodiment is provided by applying the technical concept of the invention to an outer rotor type motor). In FIG. 6, components corresponding functionally to those which have been described with reference to FIG. 1 are therefore designated by the same reference numerals or characters.

In order to provide an inner rotor type motor, it is necessary to mount magnets on the magnet yoke which is held around the rotary sleeve 31. For this purpose, the cup member 16 should be shaped as follows: Its outer cylindrical portion (corresponding to the yoke 16D in FIG. 3) is short, and the inner cylindrical portion (serving as a yoke) forming the rotary sleeve press-fitting opening 16A is longer than the axial length of the magnets 6.

Similarly as in the first embodiment, the weight is reduced, and the manufacturing cost is decreased.

In the case where the axial length of the magnets 6 are long in axial length, then even if the metal plate is drawn to form the inner cylindrical portion into which the rotary sleeve is fitted, the resultant inner cylindrical portion may not be long enough as the yoke for the magnets 6. In this case, as shown in FIG. 6, the inner cylindrical portion of the cup member 16 is made short, and a cylinder 16-1 is connected to the inner cylindrical portion so as to serve as the yoke for the magnets.

The other arrangements, such as the surrounding wall provided between the base plate 9 and the lower end of the stator core for preventing the entrance of dust, are the same as those in the first embodiment.

Third Embodiment

Figure 7:
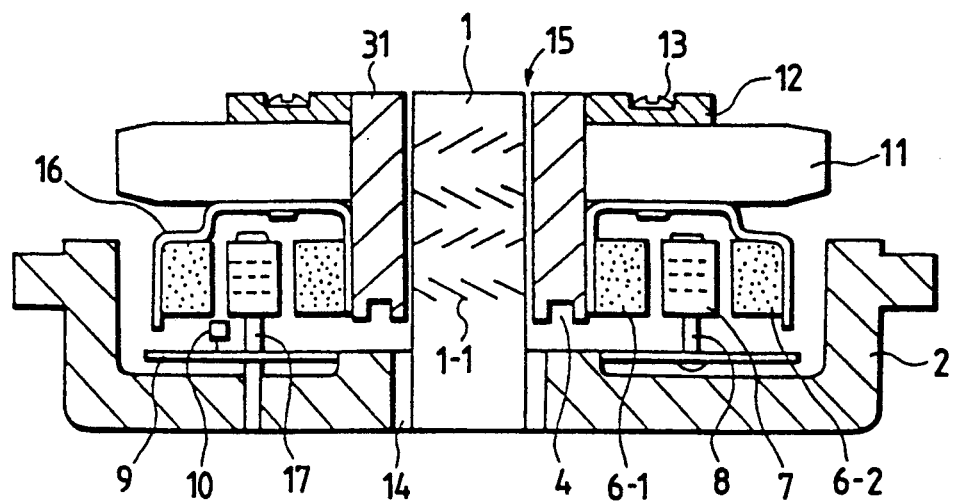
FIG. 7 is a sectional view of another example of the electric motor, which constitutes a third embodiment of the invention.

An electric motor, a third embodiment of the invention, is as shown in FIG. 7, in which components corresponding functionally to those which have been described with reference to FIG. 1 are therefore designated by the same reference numerals or characters. In FIG. 7, reference character 6-1 and 6-2 designate magnets. In the third embodiment, it is intended to reduce not only the weight but also the size.

The third embodiment is different from the first and second embodiments in that the axial length of the magnets is reduced to about a half, and the magnets are arranged on both sides of the stator core. The magnets 6-1 are arranged inside of the stator core, and the magnets 6-2 are arranged outside of the stator core. The reduction of the axial length of the magnets to about a half, the motor is reduced in thickness as much. That is, the miniaturization of the motor has been achieved.

If this arrangement Of the magnets results in a reduction of torque, then the miniaturization cannot be appreciated. However, with the third embodiment, the torque is not reduced. This will be described in more detail.

Figure 8:
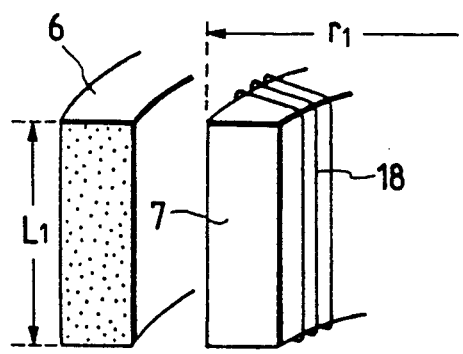
FIG. 8 is an explanatory diagram showing magnets provided only on one side of the stator core.

In FIG. 8, the magnets are provided only on one side of the stator core. In FIG. 8, reference character $L_1$ designates the axial length of each magnet.

More specifically in FIG. 8, the magnets are provided only outside of the stator core 7, and toroidal coils 18 are wound on the stator core 7.

Electromagnetic forces for rotation are produced at the parts of the toroidal coils 18 which are confronted with the magnets 6. Accordingly, the torque is the product of the electromagnetic force produced at the part and the distance $r_1$ between the part and the center of rotation.

Figure 9:
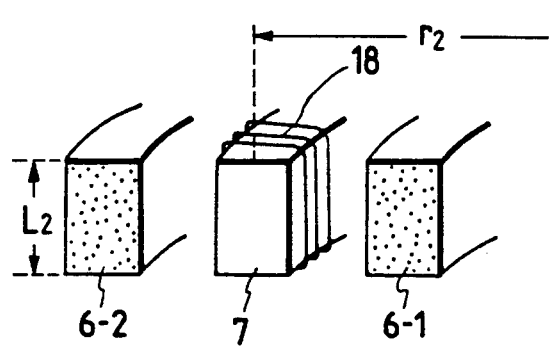
FIG. 9 is an explanatory diagram showing magnets provided on both sides of the stator core.

In the case of FIG. 9, the magnet provided on both sides of the stator core. Of the toroidal coil 18, the coil wires on the inside of the stator core 7 confront the magnet 6-1, whereas the coil wires on the outside of the stator core 7 confront the magnet 6-2. Those coil wires on both sides of the stator core 7 produce electromagnetic forces.

The electromagnetic forces thus produced must be in the same direction (if the electromagnetic forces are in opposite directions, then they are canceled out). Accordingly, the magnets 6-1 and 6-2 are so positioned that the magnetic poles of the magnets 6-1 and 6-2 confronting each other are the same (for instance the N pole of the magnet 6-1 confronting the N pole of the magnet 6-2).

In FIG. 9, reference character $L_2$ designates the length of the magnets 6-1 and 6-2 in the axial direction.

Since both the coil wires on the inside and outside of the stator core 7 produce electromagnetic forces, the distance between the center of rotation and the coil wires producing the electromagnetic force may be the average $r_2$ of the distance between the inner coil wire and the center of rotation and the distance between the outer coil wire and the center of rotation.

The difference between the values $r_1$ in FIG. 8 and the value $r_2$ in FIG. 9 is extremely small, being a half of the thickness (measured radially) of the stator core 7. Therefore, the axial length $L_2$ of the magnets 6-1 and 6-2 can be regarded shown in FIG. 8.

Thus, with the torque maintained unchanged, the axial length of the motor can be reduced; that is, the height of the motor can be reduced.

In the above-described embodiment, the magnets employed are the same in performance. However, the arrangement that the magnets are arranged on both sides of the stator core can be effectively employed in the case where it is necessary to reduce the manufacturing cost more, although it is unnecessary to decrease the thickness of the motor.

In this case, the axial length of the magnets arranged on both sides of the stator core is not made smaller than that of the magnets arranged on one side of the stator core, and instead ferrite magnets are employed.

The ferrite magnet is lower in magnetic force than the rare earth magnet. However, by arranging the ferrite magnets on both side of the stator core, the number of coil wires producing electromagnetic force is doubled, thus eliminating the difficulty that the torque is decreased.

The ferrite magnet is much lower in price than the rare earth magnet; for instance, the price of the former is one-tenth tenth to one-fiftieth of the price of the latter. Hence, in the case where the magnets are arranged on both sides of the stator core, the manufacturing cost is much lower although the number of magnets is doubled.

Figure 10:
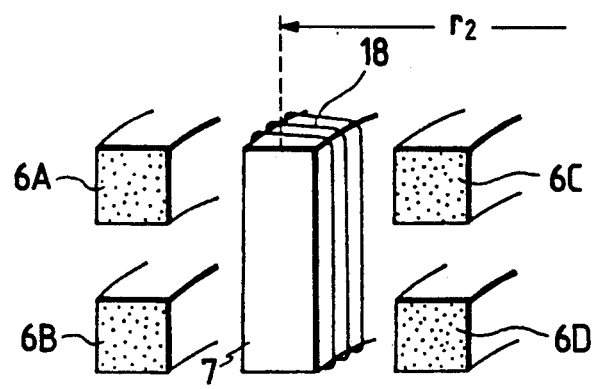
FIG. 10 is an explanatory diagram showing magnets arranged in two lines on each of the sides of the stator core.

In the case of FIG. 10, the magnets provided on both sides of the stator core are each divided into two parts. That is, in FIG. 10, reference characters 6A through 6D designate the magnets thus divided.

The torque required for rotating a motor at high speed may not be so great. Accordingly, the magnets may be not so high in magnetic force. However, in the motor to which the technical concept of the invention is applied; that is, in the motor in which the magnets producing torque perform a thrust bearing action with the aid of the magnetic attraction forces induced by the stator, it is essential that the magnets perform the thrust bearing action. Therefore, with this requirement taken into account, the magnetic forces of the magnets employed should be determined.

Hence, it is desirable to use as small magnets as possible as long as their magnetic forces are great enough to perform the thrust bearing action. That is, the use of such small magnets contributes to a reduction both in weight and in manufacturing cost.

In view of the foregoing, in the case of FIG. 10, a plurality of small magnets are arranged in two lines on each side of the stator core 7. In this case, the weight is reduced as much as the space provided between the magnets in two lines. In addition, although the number of magnets employed is increased, the manufacturing cost is decreased as a whole. Thus, the above-described arrangement of magnets contributes to a reduction of the manufacturing cost.

If, in the third embodiment, the axial length of the inner magnets 6-1 is large, an additional yoke 16-1 may be provided similarly as in the second embodiment.

The above-described electric motor according to the invention has the following merits or effects:

(1) Since the rotary sleeve is in the form of a simple cylinder with no flange, the weight and the manufacturing cost of the motor are reduced as much.

(2) In the motor of the invention, the cup member serves as the magnet yoke and as the seat on which an element to be driven by the motor is mounted. Originally, a cup-shaped element is mechanically rigid. Hence, the cup member can be made of a thin metal plate, which contributes to a reduction of the weight and the manufacturing cost.

(3) In the motor of the invention, the magnets are arranged on both sides of the stator core. Therefore, the sum of the lengths of the parts of the toroidal coil on the stator core which can be utilized for generation of electromagnetic forces is twice as long as that in the case where the magnets are arranged only on one side of the stator core.

Therefore, even if the axial length of the stator core or magnets is reduced to about a half, the torque can be maintained unchanged; that is, the motor can be reduced in thickness.

Where magnets lower in magnetic force are employed, the torque can be the same as long as the axial length is maintained unchanged. This means that magnets lower in price can be employed.

(4) In the case where the magnets arranged on both sides of the stator cores are each made up of a plurality of smaller magnets, both the weight and the manufacturing cost can be reduced more.

(5) The non-magnetic cylindrical wall for preventing the entrance of dust is coupled to the stator core at the end which is closer to the opening of the cup member. Therefore, the probability can be greatly reduced that dust enters the gap between the shaft and the rotary sleeve. Accordingly, the difficulties are substantially eliminated that the dust obstructs the smooth rotation of the rotary sleeve and damages the surface of the shaft, for instance.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An electric motor comprising:
a housing;
a shaft having one end secured to said housing;
a cylindrical rotary sleeve mounted on said shaft, said sleeve having an outer cylindrical surface and an inner cylindrical surface forming a clearance gap around said shaft;
a cup-shaped member having a centrally opened cylindrical portion, said cup-shaped member being secured to said rotary sleeve by said cylindrical portion, and serving as a seat on which an element to be driven by said motor is mounted;

at least one magnet secured through a magnet yoke attached to the outer cylindrical surface of said rotary sleeve; and a stator core secured to said housing, said stator core performing a thrust bearing action with the aid of magnetic attraction forces induced between said at least one magnet and said stator core.

2. An electric motor as claimed in claim 1, in which said cup-shaped member is fixedly secured to said rotary sleeve by press-fitting.

3. The electric motor of claim 1, further comprising a base plate disposed between said housing and said stator core, said stator core having a bottom end spaced from said base plate.

4. The electric motor of claim 3, further comprising a dust cover, having a top end connected to the bottom end of said stator core and having a bottom end connected to said base plate.

5. An electric motor comprising:
a housing;
a shaft having one end secured to said housing;
a cylindrical rotary sleeve mounted on said shaft and forming a clearance gap around said shaft;
a cup-shaped member having an outer cylindrical portion and a centrally opened inner cylindrical portion, said cup-shaped member being secured to said rotary sleeve by said inner cylindrical portion, and serving as a seat on which an element to be driven by said motor is mounted;
at least one magnet mounted fixedly on said cup-shaped member; and
a stator core secured to said housing,
said stator core performing a thrust bearing action with the aid of magnetic attraction forces induced between said at least one magnet and said stator core.

6. An electric motor as claimed in claim 5, in which said at least one magnet is fixedly mounted on the outer cylindrical surface of said inner cylindrical portion of said cup-shaped member.

7. An electric motor as claimed in claim 5, in which said at least one magnet is fixedly mounted on the inner surface of said outer cylindrical portion of said cup-shaped member.

8. The electric motor of claim 5, further comprising a base plate disposed between said housing and said stator core, said stator core having a bottom end spaced from said base plate.

9. The electric motor of claim 8, further comprising a dust cover, having a top end connected to the bottom end of said stator core and having a bottom end connected to said base plate.

10. The electric motor of claim 5, wherein said cup-shaped member is composed of a magnetic material.

11. An electric motor comprising:
a housing;
a shaft having one end secured to said housing;
a cylindrical rotary sleeve mounted on said shaft and forming a clearance gap around said shaft;
a cup-shaped member having an outer cylindrical portion and a centrally opened inner cylindrical portion, said cup-shaped member being secured to said rotary sleeve by said inner cylindrical portion, and serving as a seat on which an element to be driven by said motor is mounted;
a plurality of first magnets mounted on the inner surface of said outer cylindrical portion of said cup-shaped member;
a plurality of second magnets mounted through a magnet yoke attached to the outer surface of said rotary sleeve; and
a stator core secured to said housing so that said stator core is located between said plurality of first and second magnets,
said stator core performing a thrust bearing action with the aid of magnetic attraction forces induced between said plurality of first and second magnets.

12. An electric motor as claimed in claim 11, in which said magnet yoke is integral with said cup-shaped member.

13. An electric motor as claimed in claim 11, in which said stator core is a toroidal core.

14. An electric motor as claimed in claim 11, in which said plurality of first magnets are arranged spaced from one another in the axial direction of said shaft, and said plurality of second magnets are also arranged spaced from one another in the axial direction of said shaft.

15. An electric motor as claimed in claim 11, in which said plurality of first and second magnets are ferrite magnets.

16. The electric motor of claim 11, further comprising a base plate disposed between said housing and said stator core, said stator core having a bottom end spaced from said base plate.

17. The electric motor of claim 16, further comprising a dust cover, having a top end connected to the bottom end of said stator core and having a bottom end connected to said base plate.

* * * * *